US009131547B2

(12) United States Patent
Vaclavik et al.

(10) Patent No.: US 9,131,547 B2
(45) Date of Patent: Sep. 8, 2015

(54) ILLUMINATION DEVICE AND ILLUMINATION SYSTEM (75) Inventors: Premysl Vaclavik, Vienna (AT); Martin Kernbichler, Giesshubl (AT)

(73) Assignee: Illumination Network Systems GmbH, Vienna (AT)

( * ) Notice: Subject to any disclaimer, the term of this patent is extended or adjusted under 35 U.S.C. 154(b) by 208 days.

(21) Appl. No.: 13/509,590

(22) PCT Filed: Nov. 11, 2010

(86) PCT No.: PCT/AT2010/000433
§ 371 (c)(1),
(2), (4) Date: May 31, 2012

(87) PCT Pub. No.: WO2011/057313
PCT Pub. Date: May 19, 2011

(65) Prior Publication Data
US 2012/0229033 A1 Sep. 13, 2012

(30) Foreign Application Priority Data
Nov. 11, 2009 (AT) .................................. A 1789/2009

(51) Int. Cl.
H05B 37/02 (2006.01)
H05B 39/00 (2006.01)
H05B 41/36 (2006.01)

(52) U.S. Cl.
CPC ................................. *H05B 37/0227* (2013.01)

(58) Field of Classification Search
CPC ............ H05B 7/02; H05B 39/00; H05B 41/36
USPC ................... 315/294, 149, 153, 32, 292, 159;
340/573.2; 455/159.2; 348/143
See application file for complete search history.

(56) References Cited

U.S. PATENT DOCUMENTS 3,893,000 A * 7/1975 Guercio ......................... 315/159
5,357,170 A * 10/1994 Luchaco et al. .............. 315/159
(Continued)

OTHER PUBLICATIONS

Title: Integrated Lighting Controls, Author:www.wattstopper.com, Date:Oct. 2010.*

*Primary Examiner* — Douglas W Owens
*Assistant Examiner* — Wei Chan
(74) *Attorney, Agent, or Firm* — Jordan IP Law, LLC; Todd A. Vaughn (57) ABSTRACT

The invention relates to an illumination device (LV) comprising at least one light fixture (LE), wherein the at least one illumination device (LV) has at least one sensor device (SEV) for detecting objects (O1, O2, O3), supplying information to the illumination device (LV) for controlling the at least one light fixture (LE). This sensor device (SEV) is equipped to detect the object type (Oid1, Oid2, . . . , OidN) of a detected object (O1, O2, O3) and/or the at least one sensor device (SEV) is equipped to determine the distance of the detected object (O1, O2, O3), the illumination device (LV) having at least one memory (SPE), said memory (SPE) being equipped to store at least one light profile (LP1, LP2, . . . , LPN), such that the at least one light profile (LP1, LP2,. . ., LPN) contains luminous intensity values (W11, . . . , W1M; W21, . . . , W2M; . . . ; WN1, . . . , WNM) as a function of object types (Oid1, Oid2, . . . , OidN) and/or the distance of an object (O1, O2,O3) from the at least one light fixture (LE) of the illumination device (LV), and the illumination device (LV) comprises at least one control device (STV) which controls the at least one light fixture (LE) with a corresponding luminous intensity value (W11, . . . , W1M; W21, . . . , W2M; . . . ; WN1, . . . , WNM) in accordance with the information concerning the object type (Oid1, Oid2, . . . , OidN) and/or the distance of a detected object in accordance with the information originating from the at least one sensor device (SEV). The invention also relates to an illumination system consisting of such illumination devices which are preferably equipped for communication with one another.

20 Claims, 10 Drawing Sheets

(56) References Cited

U.S. PATENT DOCUMENTS

| | | | |
|---|---|---|---|
| 5,552,767 A * | 9/1996 | Toman | 340/540 |
| 5,726,629 A * | 3/1998 | Yu | 340/565 |
| 5,939,987 A * | 8/1999 | Cram | 340/573.2 |
| 6,124,808 A * | 9/2000 | Budnovitch | 340/932.2 |
| 6,388,399 B1 * | 5/2002 | Eckel et al. | 315/312 |
| 6,548,967 B1 * | 4/2003 | Dowling et al. | 315/318 |
| 6,583,573 B2 * | 6/2003 | Bierman | 315/149 |
| 6,608,453 B2 * | 8/2003 | Morgan et al. | 315/312 |
| 6,859,644 B2 * | 2/2005 | Wang | 455/159.2 |
| 6,909,921 B1 * | 6/2005 | Bilger | 700/19 |
| 6,960,892 B2 * | 11/2005 | Loughrey | 315/294 |
| 6,965,205 B2 * | 11/2005 | Piepgras et al. | 315/318 |
| 7,030,777 B1 * | 4/2006 | Nelson et al. | 340/933 |
| 7,045,968 B1 * | 5/2006 | Bierman et al. | 315/244 |
| 7,053,784 B2 * | 5/2006 | Hatfield et al. | 340/686.1 |
| 7,064,498 B2 * | 6/2006 | Dowling et al. | 315/291 |
| 7,186,003 B2 * | 3/2007 | Dowling et al. | 362/234 |
| 7,202,613 B2 * | 4/2007 | Morgan et al. | 315/312 |
| 7,309,965 B2 * | 12/2007 | Dowling et al. | 315/318 |
| 7,523,239 B2 * | 4/2009 | Shimizu | 710/110 |
| 7,550,931 B2 * | 6/2009 | Lys et al. | 315/291 |
| 7,619,366 B2 * | 11/2009 | Diederiks | 315/149 |
| 7,825,600 B2 * | 11/2010 | Stam et al. | 315/82 |
| 8,035,320 B2 * | 10/2011 | Sibert | 315/312 |
| 8,199,010 B2 * | 6/2012 | Sloan et al. | 340/541 |
| 8,451,116 B2 * | 5/2013 | Steiner et al. | 340/545.3 |
| 2002/0109610 A1 * | 8/2002 | Katz | 340/932.2 |
| 2002/0153851 A1 * | 10/2002 | Morgan et al. | 315/291 |
| 2003/0122507 A1 * | 7/2003 | Gutta et al. | 315/292 |
| 2004/0105264 A1 * | 6/2004 | Spero | 362/276 |
| 2005/0242267 A1 * | 11/2005 | Lovato et al. | 250/205 |
| 2006/0071605 A1 * | 4/2006 | Diederiks | 315/76 |
| 2007/0206375 A1 * | 9/2007 | Piepgras et al. | 362/147 |
| 2007/0222399 A1 * | 9/2007 | Bondy et al. | 315/291 |
| 2008/0198039 A1 * | 8/2008 | Philiben | 340/961 |
| 2008/0265799 A1 * | 10/2008 | Sibert | 315/292 |
| 2008/0273333 A1 * | 11/2008 | Berns et al. | 362/294 |
| 2009/0040750 A1 * | 2/2009 | Myer | 362/183 |
| 2009/0262189 A1 * | 10/2009 | Marman | 348/143 |
| 2009/0267524 A1 * | 10/2009 | Draaijer et al. | 315/153 |
| 2010/0001652 A1 * | 1/2010 | Damsleth | 315/149 |
| 2010/0029268 A1 * | 2/2010 | Myer et al. | 455/426.1 |
| 2010/0201267 A1 * | 8/2010 | Bourquin et al. | 315/32 |
| 2010/0207759 A1 * | 8/2010 | Sloan et al. | 340/540 |

\* cited by examiner

ILLUMINATION DEVICE AND ILLUMINATION SYSTEM

The invention relates to an illumination device comprising at least one light fixture, such that at least one sensor device for detecting objects is assigned to the at least one illumination device, said sensor device supplying information for controlling the at least one light fixture to the illumination device.

In addition, the invention relates to an illumination system comprising a number of such illumination devices.

Finally, the invention also relates to a method for illuminating a location that is to be illuminated and objects using the aforementioned illumination system.

Light fixtures are currently activated by direct external control. A source for such direct control may be, for example, a motion sensor, an acoustic sensor, a timer or a remote control signal. The luminous intensity emitted by light fixtures controlled in this way is not dependent on the type of object (e.g., vehicle, pedestrian, . . . ), which has stopped or is moving in the environment of the light fixture. The light fixture is activated, regardless of the position, speed or direction of movement of the object, regardless of whether a pedestrian, a passenger vehicle or a truck, for example, is detected by a motion sensor or an acoustic sensor.

Traditional known light fixtures thus execute only one control signal. If this control signal also contains luminous intensity information, the luminous intensity of the light fixture is adjusted accordingly.

The light fixture is deactivated directly or through interval switching independently of the object or objects in the vicinity of the light fixture, in particular independently of the position of the object, its speed or direction of movement.

Furthermore, with these known light fixtures, control is accomplished easily to the extent that the light fixture—usually with the full luminous intensity—is activated as soon as an object is detected.

One object of the invention is to permit a greatly simplified illumination of locations and objects that are to be illuminated, making it possible to save energy and optionally also offering an illumination which is subjectively perceived as more pleasant.

This object is achieved by means of an illumination device as mentioned in the introduction, such that the at least one sensor device according to the invention is equipped for detecting the type of object of a detected object and/or the at least one sensor device is equipped for determining the distance of the detected object; the illumination device has at least one memory, said memory being equipped for storing at least one light profile, such that the at least one light profile contains luminous intensity values as a function of object types and/or the distance of an object from the at least one light fixture of the illumination device and such that the illumination device comprises at least one control device which controls the at least one light fixture with a corresponding luminous intensity value in accordance with the information originating from at least one sensor device pertaining to the object type and/or the distance of a detected object.

An autonomous setting of the luminous intensity/luminous intensity of one or more light fixtures of an illumination device depending on the type of object detected (=object type) and/or the distance of the object from the illumination device and/or the light fixtures.

The sensor device basically measures the distance of an object from the sensor device itself, and then this information can easily be converted by the illumination device to the distance of the object from the one or more light fixtures of the illumination device, which is important in particular when the illumination device comprises external lights (in this regard see also the text below). The sensor device is preferably measured along with the direction of movement and/or speed of movement.

It should also be pointed out here that the object may be an object that is not classified more accurately but also may include a wide variety of objects such as passenger vehicles, trucks, motorcycles, etc. but also subjects such as people, all of which are referred to here as "objects." Likewise these may be objects that are not classified more precisely. The classification in "object types" can follow the above classification of passenger vehicles—trucks—motorcycles—people (pedestrians)— . . . , but there can also be a classification in object types according to the size of the objects, their speed, etc. or their could be a mixed classification (e.g., fast passenger vehicle, slow passenger vehicle, . . . could each also represent its own object type).

The objects that are "not classified further" are objects whose object type does not recognize an illumination device or whose object type cannot detect it (for example, due to external conditions, etc.). For these objects and/or object types not classified further, a standard light profile is provided which is used for these objects.

Fundamentally the approach according to the invention functions even if only the object type or the distance is determined. However, it is especially advantageous if the at least one sensor device is equipped to detect the object type of a detected object and also to determine the distance of the detected object from the sensor device, and a separate light profile having luminous intensity values as a function of the distance of the respective object from the at least one light fixture of the illumination device is stored in the at least one memory for each object type.

In this case, the luminous intensity of the respective light fixture(s) of an illumination device can be adjusted as a function of the object type and the distance of the object from the light fixture(s) of the illumination device.

For example, a "truck" as an object type requires a higher or lower luminous intensity of the light fixtures than the "pedestrian" object type. However, the luminous intensity of the one or more light fixtures of an illumination device can be adjusted as a function of distance—how far away the respective object is from the respective light fixture—so that the light profile can be individualized even further for each object type over the distance. For example, it is possible to provide that—apart from the different absolute luminous intensity—one light fixture lights up to a greater or lesser extent for a pedestrian than for a truck at a certain distance.

It is most especially important if the sensor device is equipped for detecting the position of a detected object, and the at least one control device controls the at least one light fixture with a corresponding luminous intensity value according to the information originating from the at least one sensor device and pertaining to the position of the detected object, i.e., in addition to the distance of the object from the sensor device (and accordingly the distance from the light fixtures of the illumination device), the direction of the object is also determined, so that the sensor device "knows" and/or can ascertain accordingly where the object is located.

For example, it may be subjectively pleasant for a person in a hallway in a building if the entire hallway is illuminated toward the front and the rear as long as the person is in this hallway, whereas in the case of motor vehicles, for example, it is important for the road in front of the vehicle to be well lighted, but the illumination in an area situated behind the vehicle is less important than it is for a person in a hallway.

Accordingly, it is important for a pedestrian on a sidewalk to be able to see better toward the front or toward the rear but the pedestrian need not be strongly illuminated himself.

It is also especially important if at least one communication device for communicating with other illumination devices of the same type is allocated to the illumination device. The communication may be either hardwired or wireless (radio, Bluetooth, WiFi, mobile cell phone, infrared, . . . ) or a wireless-hardwired communication combination is also possible.

For the communication of the illumination devices with one another, they may exchange information with one another primarily with respect to objects detected but also, for example, their current luminous intensities, and this information may be used by the illumination devices to select the luminous intensities from predetermining light profiles.

An illumination device according to the invention can be implemented in a particularly compact design if the at least one memory and/or the at least one sensor device and/or the at least communication and/or the at least one control device is/are integrated into the illumination device preferably naturally when all the aforementioned components are integrated into one device.

In this very compact embodiment of the illumination device LV according to the invention, the light fixtures (one or more light fixtures) as well as one, several or preferably all the components necessary within the context of the present invention (sensor device, memory, communication device) are integrated into the illumination device.

However, the invention equally also includes the situation in which the memory and/or sensor device and/or the communication device, for example, is/are physically separated from the light fixture(s) so that although these components are accommodated in a separate housing, the light fixtures are not arranged in this housing but instead one or more lights are arranged at different locations at a distance from these components.

Equally, however, it may also be advantageous if all the components and one or more light fixtures are also arranged in one housing but then one or more of the other external light fixtures which do not have a separate sensor device of their own, are controlled by this "unit."

In its most general interpretation, the terms "illumination device" thus refers to all the components that belong together (sensor device, communication device for communicating with other illumination devices, sensor device, control device, light fixtures), but they need not be integrated into a common unit but instead in the extreme case all of them may be arranged separately.

In the case of external light fixtures, which are controlled by the control device, the light fixtures must be equipped for communication with the control device. This may be accomplished by hardwired and/or wireless methods but fundamentally the communication device may be used for communication of the illumination devices with one another or there may a separate communication device by means of which the control device communicates with the external light fixtures.

The illumination device may comprise one or more internal, purely external or mixed internal and external light fixtures.

External light fixtures which are usually located at a certain distance from the sensor device so these light fixtures do not assume the same position with respect to an object as the sensor device, a corresponding value from a light profile may be assigned and transmitted again using an extrapolation for example. However, this type of "central control" is generally used only for a limited number of light fixtures in a certain environment around the sensor device (for example, a distance of approx. 15 meters) and is advantageous in particular in those cases in which the light fixtures are installed at very short distances from one another such as in a tunnel or a corridor in a building.

It is fundamentally sufficient for the invention if the light fixtures of an illumination device can be turned on and off. However, it is especially advantageous if the at least one light fixture can be switched to various power levels or is dimmable or if the light fixtures can be regulated at different discrete luminous intensities.

To achieve the most harmonious possible lighting pattern, it is also expedient if the at least one sensor device is additionally equipped to detect the speed and/or to detect the direction of movement of the object and if the control device is equipped to adjust the rate of activation and/or deactivation and/or the duration of illumination of the at least one light fixture of the illumination device as a function of the speed of the detected object and/or the direction of movement of the object and/or the position of the object.

Based on the instantaneous speed of an object, its distance from a light fixture and optionally its position with respect to the light fixture, the duration of illumination and the on/off time are calculated by the control device. In particular the object defined in the introduction is achieved with an illumination system as mentioned above in which each illumination device according to the invention is controlled independently of the detected object type and/or the distance in particular the position of an object from the at least one light fixture of an illumination device with a corresponding luminous intensity.

It is especially advantageous, as already mentioned above, if neighboring illumination devices communicate with one another by means of their communication means for exchanging information in the illumination system according to the invention, such that the information transmitted by an illumination device includes at least sensor information from its at least one sensor device, and wherein an illumination device receiving such information transmitted by one or more neighboring illumination devices will take this information into account in selecting the luminous intensity for its at least one light fixture.

An especially simple design of the illumination system is obtained when the same light profiles are stored in all illumination devices of the illumination system. Furthermore, in this way all relevant information about autonomous adjustment of the luminous intensity is available to each illumination device.

The information content which is transmitted to the other illumination devices/light fixtures in real-time operation can be reduced thereby and this also reduces the technical requirements of the communication link. For a movable object that has already been identified in the system, it is sufficient accordingly if one illumination device sends a message about the direction and speed of the object to the next illumination device and also transmits the message "next value from the table" (and/or specifying which value is to be taken from the table).

If one illumination device comprises multiple light fixtures, which illuminate different areas (and not essentially one area), then the illumination device naturally converts the information it has received from its own sensor device and/or other illumination devices, to the distances of the light fixtures accordingly.

In addition, the fact of using identical profiles in all illumination devices offers the advantage that when replacing the illumination device, for example, the light profiles can be retrieved from another neighboring illumination device.

Accordingly, even with a change in one or more light profiles, which are essentially installed in only one illumination device in the system and may then be distributed among or retrieved the other devices in the system.

The system according to the invention is thus very robust. If one illumination device fails or loses its profile data, the other illumination devices nevertheless have correct values from their own tables.

In addition, it is also expedient if the choice of the illumination devices to which information is transmitted from one illumination device is object specific, i.e., depends on the specific object type.

For the reason given above, it may also be advantageous if, alternatively or additionally, the choice of the illumination devices to which information is transmitted from an illumination device depends on the position of the object in the illumination system.

For example, if a light profile having four values (e.g., FLAS=4; regarding the term "FLAS," see the description further below) is assigned to an object, then an illumination device, which is located four distance units (=four light fixtures) away from the object, will automatically not forward the information further because no additional values are present in the light profile and thus they are not of further relevance for the next illumination device. This decision is object specific. In the case of an object with six values, for example, in the light profile (e.g., FLAS=6), an illumination device which is four distance units away from the object O5 will send the information further. This system suitability guarantees that the information is propagated only over a short distance, so that the transmitted data and the system have a high stability.

In a concrete embodiment of the invention, it is provided that an illumination device communicates only with illumination devices neighboring it.

The term "neighboring" refers, for example, to all the light fixtures present in certain surroundings or in fact only the directly neighboring light fixtures, for example, in a linear arrangement of the illumination devices, this would refer only to the illumination device arranged directly in front and directly behind.

Finally, it is also favorable if any illumination device decides autonomously to which illumination devices it will transmit information detected itself [by that illumination device] or information obtained from one or more other illumination devices.

"Autonomous" here means that the illumination device in question does in fact make the respective decision itself, i.e., completely independently. To be sure information from other illumination devices may also be used to reach a decision and this is usually the case—assuming that such information is available. Whether and how the illumination device in question uses this information, however, remains up to said illumination device itself alone // only to itself.

Therefore the illumination system can be expanded infinitely in principle without running any risk that the information will be propagated infinitely. Furthermore, a decentralized system can be created in this way.

A system expansion by adding additional illumination devices can be performed at each illumination device node and/or communication node, so that two separate systems can be connected to one another without any rearrangement measures.

For the case when one illumination device sends information only to neighboring illumination devices, the illumination device thus decides whether information is transmitted at all and whether the received information is relayed further.

Finally, the object defined in this introduction is achieved with a method of the type already mentioned in which each illumination device is controlled according to the invention independently of the object type detected and/or independently of the distance, in particular the position of an object from the at least one light fixture of the illumination device with a corresponding luminous intensity.

Preferably neighboring illumination devices communicate with one another by means of their communication means for exchanging information, such that the information transmitted by an illumination device contains at least sensor information from its at least one sensor device and such that such an illumination device receiving such information transmitted by one or more neighboring illumination devices will take this information into account into selecting the luminous intensity for its at least one light fixture.

Furthermore, it is possible to provide that the same light profiles are stored in all illumination devices of the illumination system.

In addition, it is advantageous if an illumination device selects the illumination devices to which it will transmit information in an object-specific manner, i.e., as a function of the type of object and/or if an illumination device selects the illumination devices to which it will transmit information as a function of the position of the object and also as a function of the direction of movement in the illumination system.

In a concrete embodiment of the method according to the invention, it is also provided that an illumination device communicates only with its neighboring illumination devices.

Furthermore, it is possible to provide that each illumination device decides autonomously to which illumination devices it will transmit information detected itself and/or information received from one or more other illumination devices.

Each illumination device, considered separately is a central control unit which is synchronized/equalized with other illumination devices before a decision-making process. In the event of failure of one or more illumination devices, the function of the other illumination devices is affected only slightly or not all because each illumination device contains all the light profiles and its own control logic.

Each illumination device can evaluate several objects which it detects as well as evaluating information about several objects and their properties, such as the object type, the direction of movement, the speed, size, self-lighting, etc., which it receives from one or more other illumination devices, on the basis of the predefined relationships, then select the corresponding luminous intensity and breaking-in time and, depending on the result, send a single message to the neighboring illumination devices.

It is not necessary for the sensors of the individual illumination devices to first send the signals to a central control unit which must then also know the respective positions of the sensors exactly like those of the light fixtures to then be able to transmit the control sensors with the desired luminous intensity to the specific light fixtures. In this case namely when there are multiple objects, control in real time is no longer possible due to the latency inherent in the network and system. The natural limit for systems having a central control unit is given here by the data transmission bandwidth, the number of objects and the number of independently controlled light fixtures.

Unlike the state of the art, the detected information is also not propagated through the network of the illumination devices to an unlimited extent, and the information is not only propagated in the direction of movement but instead is preferably propagated in all direction (e.g., to all neighboring illumination devices). Furthermore, in the present invention, the range of the information, i.e., how far the information is sent from an illumination device, is adjustable.

The distribution of a message to neighboring illumination devices or the maximum number of illumination devices (range) by means of which this message is propagated is regulated in the light profiles.

The above mentioned predefined and programmable relationships define the behavior of the illumination system and the individual illumination device in interaction of two or more objects. Thus a common light profile which corresponds optimally to the given situation is defined.

EXAMPLE

Three Situations a), b), c)

a) a vehicle approaches a pedestrian walking in the opposite direction on the sidewalk
b) a vehicle approaches a pedestrian walking on the sidewalk in the same direction as the vehicle is traveling
c) a vehicle approaches a pedestrian crossing the road Although the individual light profiles for the two objects are identical, a different light profile which corresponds optimally to the overall situation is generated in each of the three situations.

There is also no limit for the maximum number of detectable objects, because, as described above, only one single message is sent by an illumination device at a certain point in time, said message containing information derived from a number of detected items of information or from the results of the relationships derived from information obtained from other illumination devices and from information from its own sensors.

Due to the relationship calculation, the information is de facto compressed into a result so that one always has control of not only the number of objects but also the bandwidth required for data transmission.

The invention is explained in greater detail below on the basis of the drawing, in which

Figure 1:
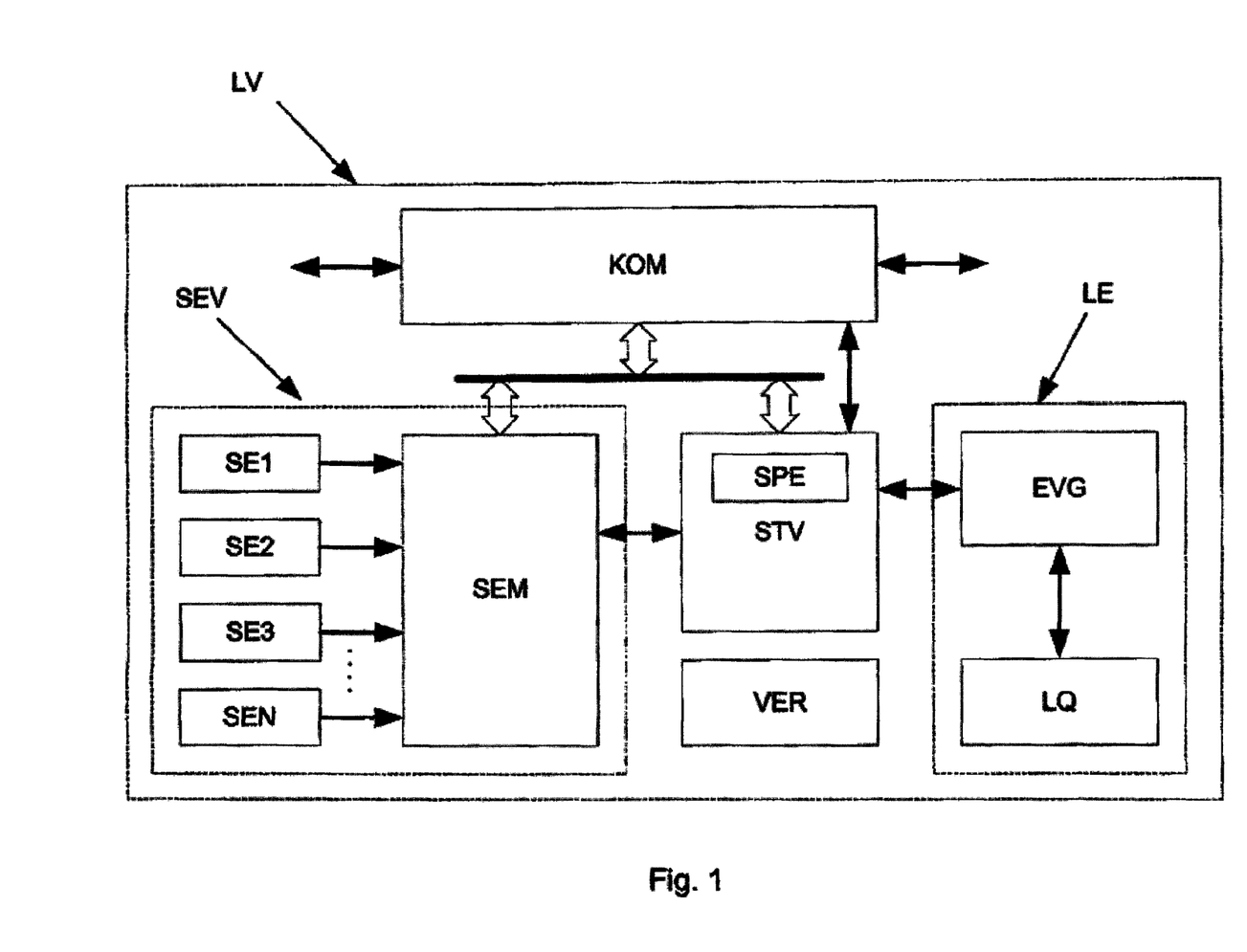
FIG. 1 shows a variant of an illumination device according to the invention.
Figure 2:
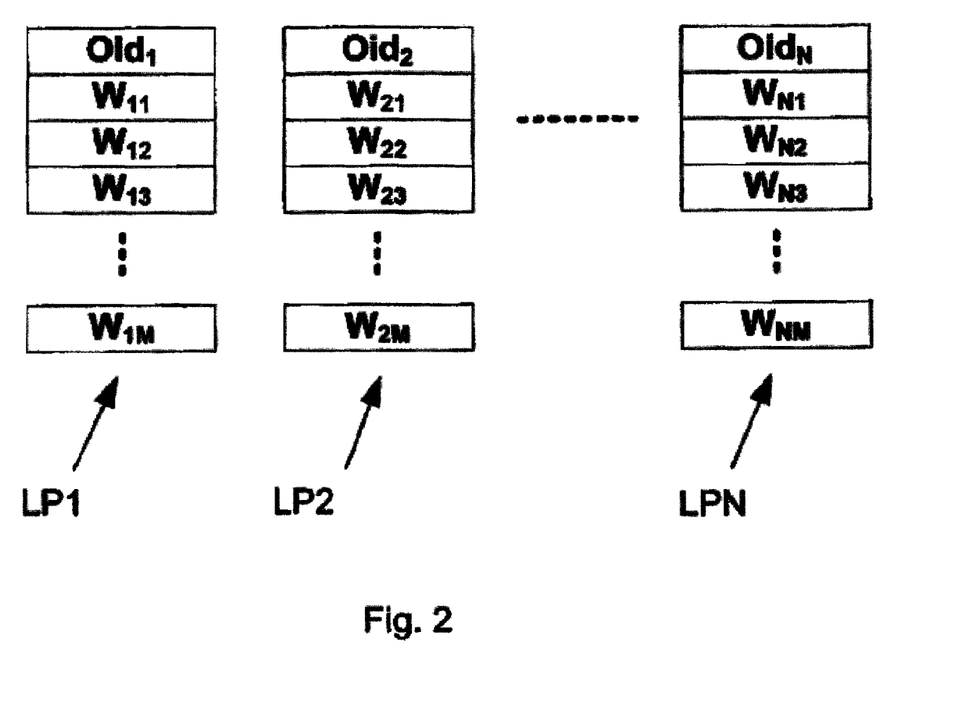
FIG. 2 shows an exemplary schematic diagram of light profiles.

FIG. 1 shows a first variant of an illumination device LV according to the invention, but the following text also makes reference to FIG. 2. The power supply unit of the illumination device LV is labeled with reference notation VER.

The illumination device LV in this diagram includes a light fixture LE which consists essentially of the light source LQ and an electronic ballast EVG. The light device LV may naturally also include multiple light fixtures.

The illumination device LV also has a sensor device SEV for detection of objects O1, O2, O3 (see additional figures), said sensor device SEV of the illumination device LV also supplying information for controlling the at least one light fixture LE.

The sensor device contains a sensor module SEM having a signal processing unit to which one or usually more different sensors SE1, SE2, SE3, . . . , SEN are connected. The signal processing unit processes the primary signals originating from the sensors so that the sensor device SEV itself then detects only simple information such as: "an object type O2 has been detected the position of O2 is XX, the speed is O2 is YY, the road surface is wet, the luminous intensity on the road is etc."

The sensors SE1-SEN may be sensors for object recognition and object tracking, audio sensors, infrared and/or radar sensors for detecting the direction of movement of the object, etc. In addition, sensors may also be provided for detecting the "basic brightness," for example, a light fixture must provide less illumination if the basic brightness is higher than in other cases (e.g., in strong moonlight, etc.). Thus, under some circumstances, it may also be possible to detect whether a neighboring light fixture has failed and to adapt the luminous intensity accordingly, etc.

The sensor device SEV is equipped for detecting the object type Oid1, Oid2, . . . , OidN of a detected object O1, O2, O3 and/or for determining the distance of the detected object O1, O2, O3 for determining the object type and distance. Furthermore, it is advantageous if not only the distance is determined but also the position, the direction of movement and the speed of the object are also determined in general.

As a rule, as also explained in greater detail below, it is important to know "how many" light fixtures (unit of distance=distance of the light fixtures for the case of approximately the same distances between the light fixtures) an object is away from a certain light fixture, so that the distance measurement is concentrated primarily on this question and the position measurement is concentrated on the question of how many light fixtures there are between the given object and a certain light fixture—in front, behind, at the side, above or below.

In addition, the illumination device LV has a memory SPE which in this embodiment is designed as part of the control device STV.

The memory SPE is equipped for storing N light profiles LP1, LP2, . . . , LPN (FIG. 2) in this example, where the light profiles LP1, LP2, . . . , LPN contain luminous intensity values W11, . . . , W1M; W21, W2M; . . . ; WN1, . . . , WNM as a function of object types Oid1, Oid2, . . . , OidN and as a function of the distance, preferably the position of an object O1, O2,O3 to the one light fixture LE of the illumination device LV.

The control device STV now controls the light fixture LE with a corresponding luminous intensity value W11, . . . , W1M; W21, ..., W2M; ...; WN1, ..., WNM from a light profile corresponding to the object type and does so by using the information pertaining to the object type Oid1, Oid2, ..., OidN and the distance (position) of a detected object, this information having been obtained from the sensor device SEV.

With the preferred variant shown here, the illumination device LV already has a communication device KOM for communicating with other illumination devices of the same type. The communication may be via hardwired or transmission (radio, Bluetooth, WiFi, mobile telephone, infrared, ...) or a mixed wireless hardwired communication is also possible.

Through communication of the illumination device with one another, they can primarily exchange information with one another with respect to detected objects but also with regard to their momentary light intensities, and this information can then be exchanged by the illumination devices for selecting the light intensities from the given light profiles.

The illumination device according to the invention as shown in FIG. 1 can be implemented in a particularly compact design because all the relevant components for the illumination device such as the memory SPE, sensor device SEV, communication device KOM, control device STV as well as the light fixture(s) are already integrated into a device LV.

Figure 1A:
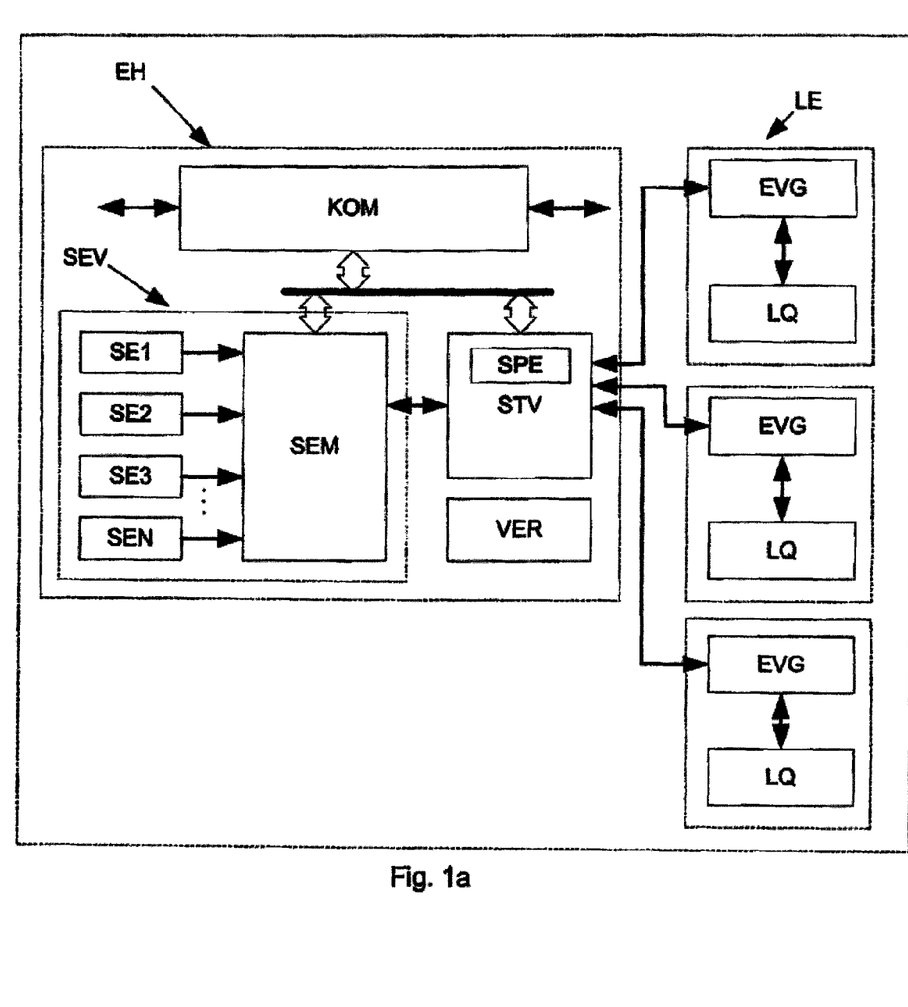
FIG. 1a shows another variant of an illumination device according to the invention.

However, certain components may also be provided externally or all components except for the light fixtures may be integrated into a shared unit EH, which is connected to a number of external light device LE, for example, three light devices LE as shown in FIG. 1a. The light device LV in this example consists of the unit EH and the three light fixtures LE connected thereto.

Figure 1B:
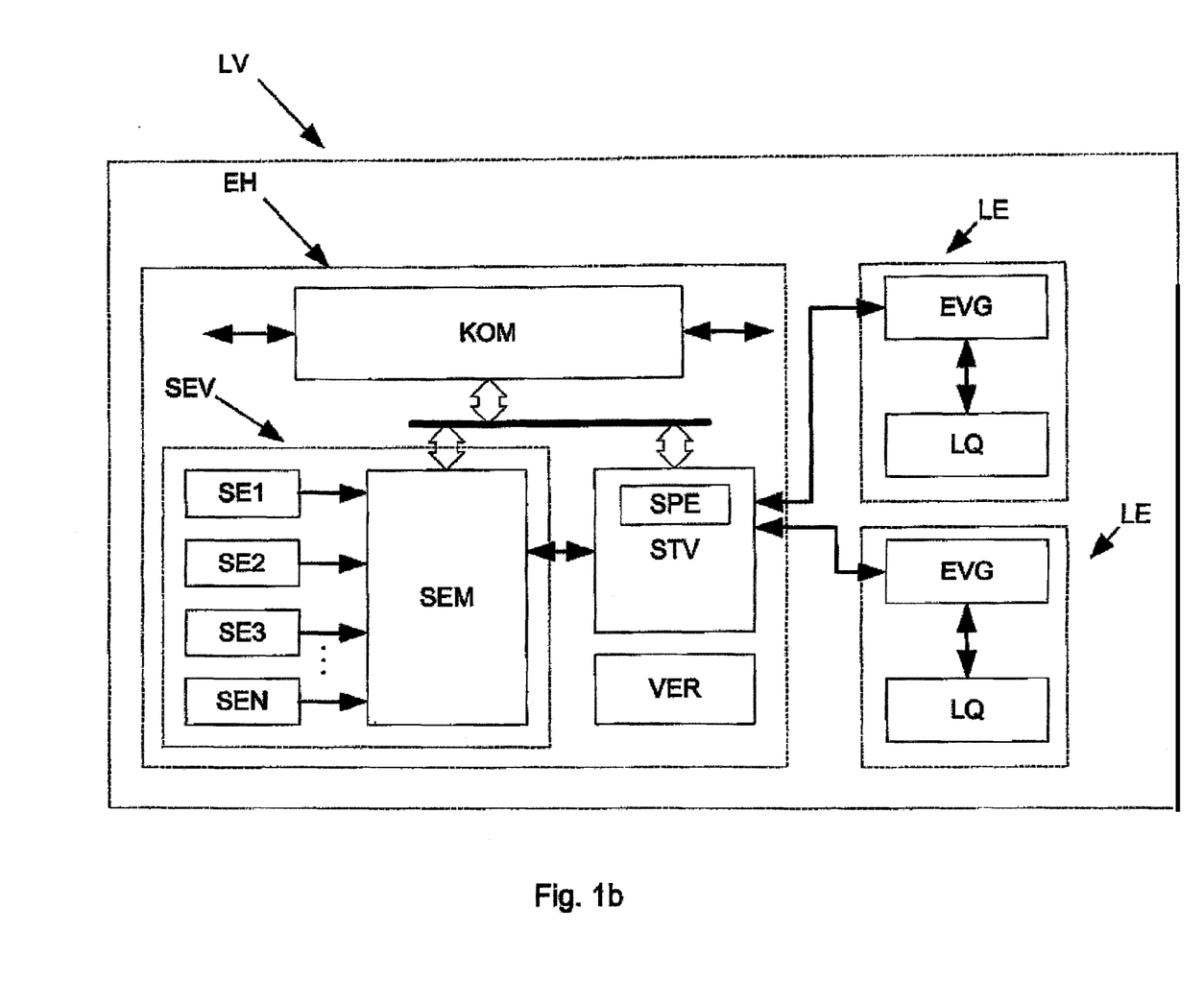
FIG. 1b shows yet another variant of an illumination device according to the invention.

However, it may just as equally be advantageous if, as shown in FIG. 1b, all the components and also one or more light fixtures are arranged in one housing EH (according to FIG. 1) but then one or more external light fixtures which themselves do not have a sensor device, communication device or control device are also triggered by this unit EH. The illumination device again comprises the unit EH and the external light fixtures LE.

In its general interpretation, the term "illumination device" thus refers to all the components that belong together (sensor device, communication device for communicating with other illumination devices, sensor device, control device, light fixtures) but these need not be integrated into a common housing but instead all of them may be arranged separately in the extreme case.

In the case of external light fixtures, which are controlled by the control device, the light fixtures must be equipped for communicating with the control device. This may be accomplished in a wireless and/or hardwired system, wherein the communication device may fundamentally be used for communication of the illumination devices with one another or if a separate communication device, by means of which the control device communicates with the external light fixtures, is available.

The illumination device may include one or more internal purely external or mixed internal and external light fixtures.

A corresponding value from a light profile may be assigned by using extrapolation, for example, and transmitted to external light fixtures, which are usually located at a certain distance from the sensor device, so these light fixtures cannot assume the same position with respect to an object as the sensor device. However, this type of "central control" is usually used only for a limited number of light fixtures in a certain environment around the sensor device (to a distance of approx. 15 meters, for example) and is advantageous in particular in most cases in which the light fixtures are installed at very short distances from one another, as in a tunnel or corridor in a building.

FIG. 2 shows light profile LP1, LP2, ..., LPN, such as those already mentioned briefly above, for N different object types Oid1, Oid2, ..., OidN. Each light profile contains a list of luminous intensity values W11, W12, ..., W1M (for the object type Oid1), ..., WN1, ..., WNM (for the object type OidN) for the respective object types. "M" denotes the number of illumination devices or light fixtures used for illumination for a certain object type and forming its aura; this number may be different for different object types, but that is not illustrated in FIG. 2.

The values W11, ... represent either the luminous intensity to be actually emitted by the light fixture or preferably the luminous intensity or light intensity with which the environment around the light fixture is to be illuminated. In the latter case, depending on the external factors, the luminous intensity emitted by the light fixture can be adapted to achieve the value for the surroundings.

The values W11, ... in the light profiles define a light image ("aura") for each object type, such that this aura moves as the object moves. The light profiles usually do not include distance values, as already mentioned, because the distance is quantified with the spacing of the light fixtures, i.e., each tabulated value is based on a light fixture having a certain (light fixture) distance from the object.

Figure 3A:
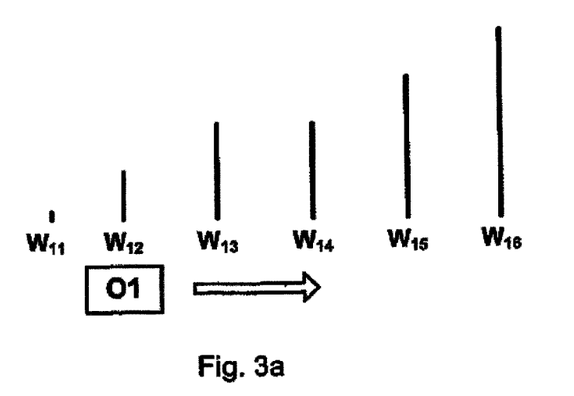
FIG. 3a shows a light profile, i.e., an aura for a first object.
Figure 3B:
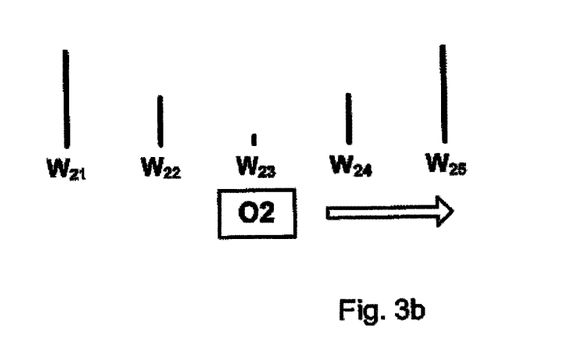
FIG. 3b shows a light profile, i.e., an aura for a second object.

For the sake of illustration reference is made to FIGS. 3a and 3b. FIG. 3a shows an object O1 (=Oid1) for which an aura is defined with six light fixtures. These light fixtures are spaced a distance of 20 meters apart from one another for example, i.e., 6 light fixtures for 100 meters. The aura of such an object extends on the one hand to the area in front of the object (FLAS, "forward light aura shape") and on the other hand extends to the area behind the object (BLAS, "backward light aura shape").

In the examples in FIG. 3a it is provided that the FLAS comprises five light fixtures and the BLAS comprises one light fixture, i.e., there are five light fixtures in front of the object O1 and there is one light fixture behind the object. Accordingly, the light profile includes six luminous intensity values W11-W16, such that the values W12 (the second value in the table) describe the luminous intensity value under the light fixture (and describes the first value of the FLAS), W13 describes the luminous intensity values of the light at "a" light fixture distance from the light fixture at which the object is located, etc. The value W11 describes the luminous intensity for the one light fixture downstream from the object.

If the object moves along a row of light fixtures, this aura also travels with the object, i.e., the light fixture beneath which the object is located (value W12) is occupied with the value W11 as movement is continued, etc.

FIG. 3b shows an example of an object O2 which must comprise an aura of five light fixtures, the FLAS comprising thee light fixtures and the BLAS comprising two light fixtures.

Figure 3C:
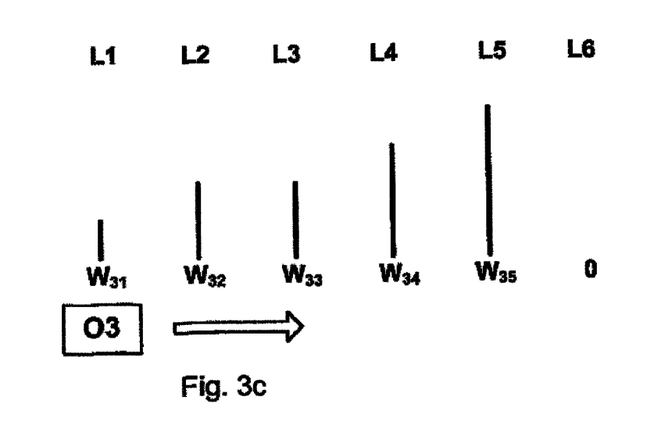
FIG. 3c shows a light profile, i.e., an aura for a third object.

If the situation is such that one object does not have a BLAS, i.e., there is no light fixture behind the object, then the value W11 describes the luminous intensity for the light fixture beneath which the object is at that moment (FIG. 3c).

Figure 4:
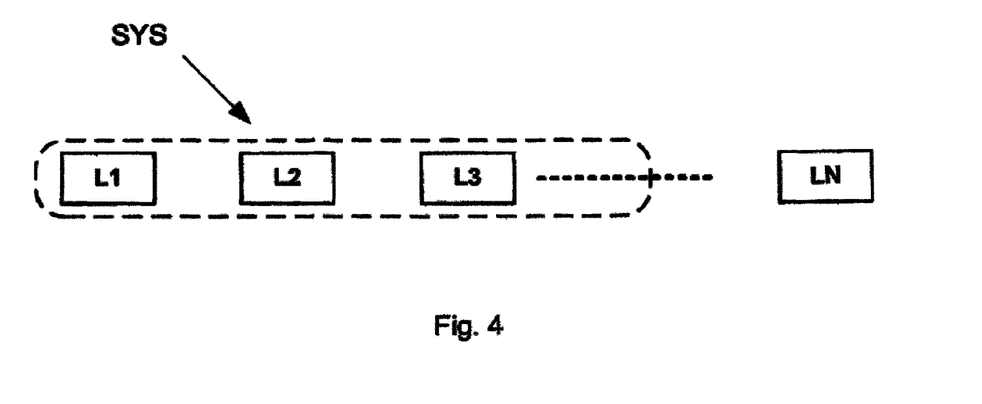
FIG. 4 shows a one-dimensional arrangement of light fixtures in an illumination system.

FIG. 4 shows an illumination system SYS according to the invention in a "one-dimensional" configuration. This illumination system SYS consists of the illumination devices (or light fixtures) L1 ... LN, which are arranged along a segment (straight line, curve, corner in a hall, etc.).

Figure 5:
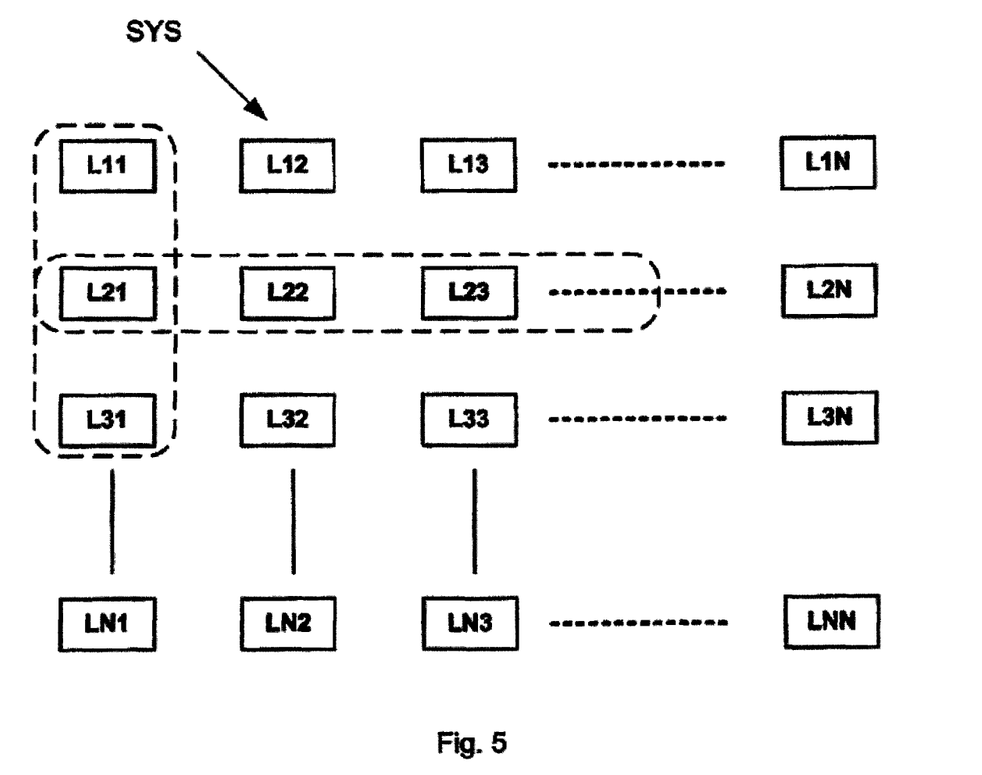
FIG. 5 shows a two-dimensional arrangement of light fixtures in an illumination system.

Another illumination system SYS according to the invention in a "two-dimensional" configuration is shown in FIG. 5, where the light fixtures (or illumination devices) L11, ..., LM1, ..., L1N, ..., LMN are distributed over an area. In such a two-dimensional configuration, the aura of an object also includes the left aura ("left LAS") and a right aura ("right LAS") whose corresponding luminous intensity values may again be imaged in a one-dimensional table (light profile).

However, the light profile may also be defined in a 2D table (matrix) in which there is a definition for each object type, indicating what is the central position (i, j) for a certain object type, i.e., this is the value of the luminous intensity which is based on the position (light fixture) at which the object is located. Different types of objects may have different central positions. The aura, i.e., the luminous intensity and the number of light fixtures lit up in all directions of an object type are defined by this matrix. Such a representation of the light profile is especially suitable for parking places or for large areas with light fixtures in a grid construction.

Essentially it can be pointed out that the invention can be applied in principle to any arrangement of light fixtures/illumination devices but that an especially simple implementation is obtained when the light fixtures are arranged equidistant from one another in a 1D, 2D or 3D configuration.

Figure 6:
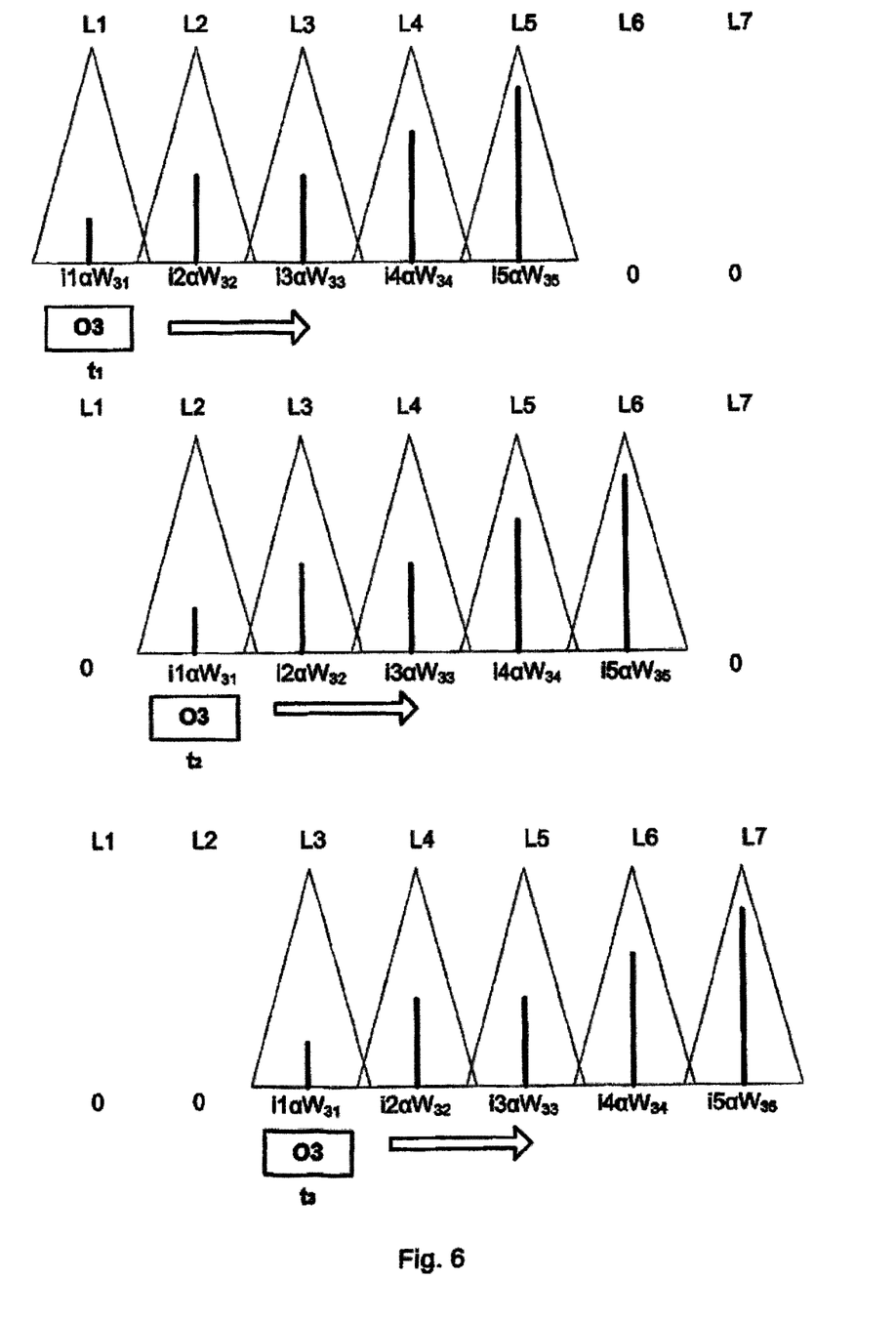
FIG. 6 shows the light distributions in an illumination system at three different times with a moving object.

FIG. 6 also shows the continued movement of an object O3 (see aura in FIG. 3c) along a linear configuration of light fixtures L1-L7, each of which emits a luminous intensity of i1-i7. For the same of simplicity, it is assumed in FIG. 6 and in particular in FIGS. 7 and 8 that the two light fixtures L1, ... are illumination devices having all the relevant components including a light fixture arranged at a shared location (e.g., in a housing), and the terms light fixtures and illumination devices are used as synonyms in discussing these figures. This serves primarily as a simpler representation of the idea according to the invention and should not constitute a restriction of the invention.

According to the aura in FIG. 3c, the light intensities at time t1 (object O3 is beneath the light fixture/illumination device 11) conform to the following relationship: $i1 \propto W11$, $i2 \propto W12$, $i3 \propto W13$, $i4 \propto W14$, $i5 \propto W15$, $i6=0$, $i7=0$.

If the object O3 moves and if it is beneath the light fixture L2 at the time t2, then the following relationships hold: $i1=0$, $i2 \propto W11$, $i3 \propto W12$, $i4 \propto W13$, $i5 \propto W14$, $i6 \propto W15$, $i7=0$. Finally, at time t3 it holds that $i1=0$, $i2=0$, $i3 \propto W11$, $i4 \propto W12$, $i5 \propto W13$, $i6 \propto i14$, $i7 \propto W15$.

Figure 7:
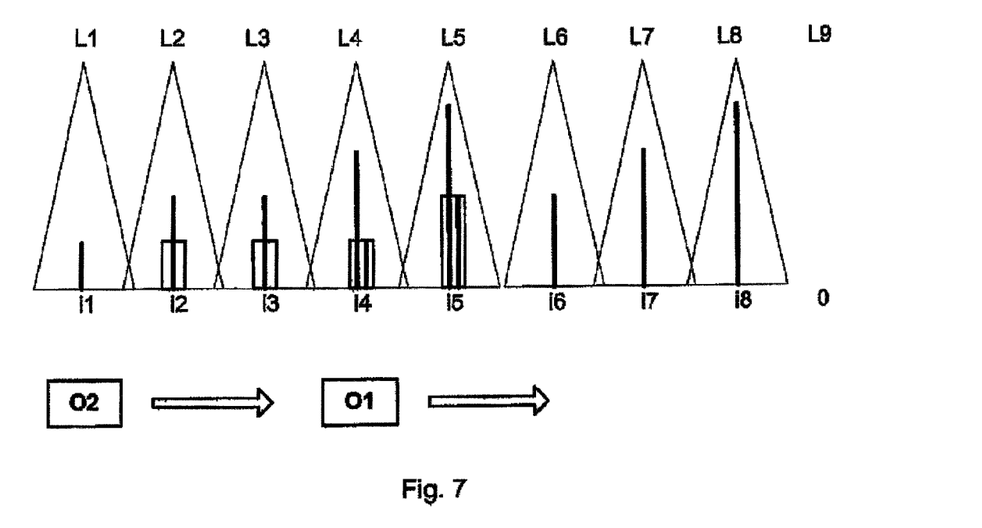
FIG. 7 shows the light distributions in an illumination system for the case of two objects moving in one direction.

FIG. 7 shows another situation (9 light fixtures/illumination devices are shown) in which two objects O1, O2 are moving from left to right along the illumination system. In this example it is assumed that both objects O1, O2 have an aura like that represented in FIG. 3c.

In principle, the light fixtures L1-L5 would be controlled in accordance with the light profile (the aura) of the object O2, and the light fixtures L4-L8 would be controlled in accordance with the light profile (identical in this example) of the object O1. Since the light fixtures can now communicate with one another, the respective light fixtures know of the presence of the objects O1, O2 and to prevent glare from the object O1 due to the object O2 driving behind it, but possibly approaching it, there is a reduction in the luminous intensity of the lamps situated behind the object O1 in accordance with defined rules. In the example shown here, the light fixtures L2-L4 are set at the central value of the object O2, i.e., here at the value beneath the light fixture L1. The light fixture L5 is actually controlled with two values, a high value of O2 and a lower value of O1; in this specific case the lower value of object O1 is used.

Figure 8:
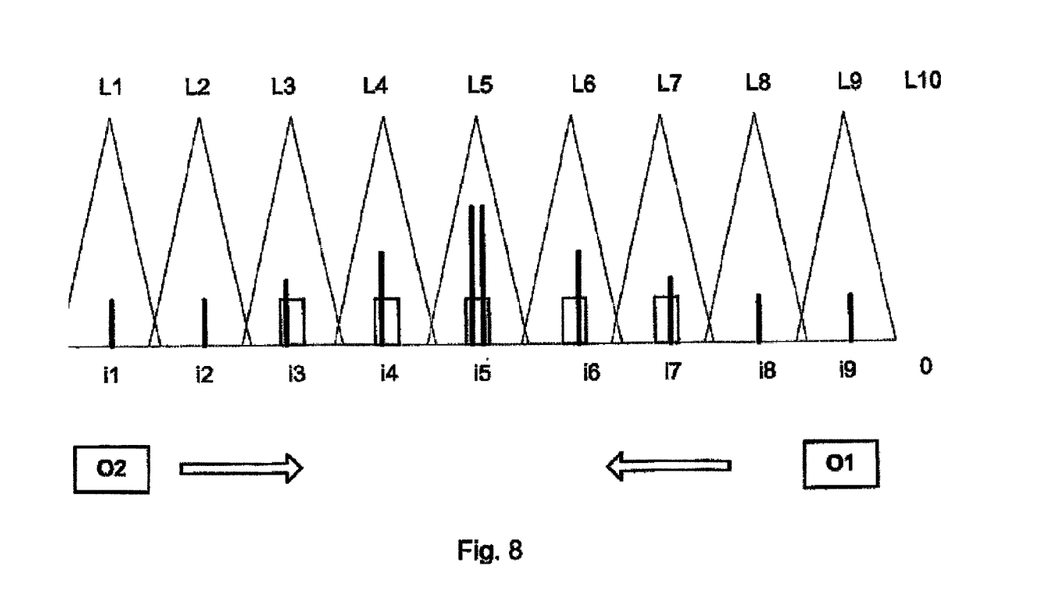
FIG. 8 shows the light distributions in an illumination system for the case of two objects moving in opposite directions.

FIG. 8 shows a similar situation with objects moving toward one another. The illumination system here should not cause glare or irritation due to a change in luminous intensity. In practice, automobile drivers in such situations will also switch from high beams to low beams and the adaptation of the light distribution in this system should take place in a similar way.

To achieve the most harmonious possible lighting pattern, it is also expedient if the sensor device SEV of an illumination device LV is also equipped to detect the speed of the objects O1, O2, O3 detected and/or the direction of movement of the object O1, O2, O3.

Furthermore, the control device STV is equipped to adjust the start-up and/or stopping rates and/or the duration of illumination of the at least one light fixture LE in the illumination device LV as a function of the speed of the object O1, O2, O3 detected and/or of the direction of movement of the object O1, O2, O3 and/or of the position of the object O1, O2, O3.

Based on the momentary speed of an object, its distance from a light fixture and optionally its position with respect to the light fixture, the duration of illumination and the on and off time are calculated by the control device.

It is especially advantageous, as already stated, if neighboring illumination devices in the illumination system SYS according to the invention communicate with one another by means of their communication means KOM for exchanging information with one another, wherein the information transmitted by an illumination device at least contains sensor information from its at least one sensor device SEV, and wherein such an illumination device receiving information transmitted by one or more neighboring illumination devices will take this information into account in selecting the luminous intensity for its at least one light fixture.

Figure 9:
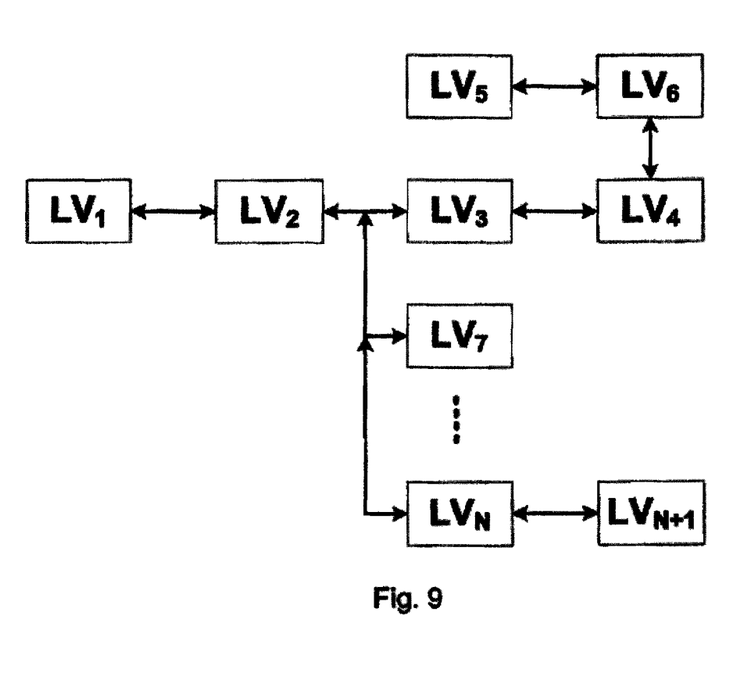
FIG. 9 shows a schematic exemplary embodiment communication between illumination devices in an illumination system according to the invention.

FIG. 9 shows an example of a communication in illumination system consisting of the illumination devices LV1, LV2, ..., LV7, LVN, LVN+1. The communication is bidirectional and is in the form of a 1 to 1 communication between the illumination device LV1 and LV2 and in the form of a 1 to N communication between the illumination device LV2 and the remaining illumination devices LV3-LVN+1. The illumination devices LV3-LV7 in turn communicate only with their immediate neighbors, but the communication is such that the communication is looped through if there is a failure of one illumination device.

FIG. 9 shows only a detail of the overall configuration. LV8 may come after the illumination device LV7, etc. Each illumination device has two communication connections. Thus each illumination device can send or receive in both directions. If an object in FIG. 9 moves out of the direction of the illumination device V1 [sic; LV1?], LV2, the illumination device LV2 transmits information to LV3, LV7, LVN. If LV7 is the last illumination device, the information is not transmitted further because there are no other illumination devices present.

If an object in FIG. 9 moves out of the direction of the illumination device LV7, the lighting LV7 transmits the information to LV2, LV3 and LVN.

Figure 10:
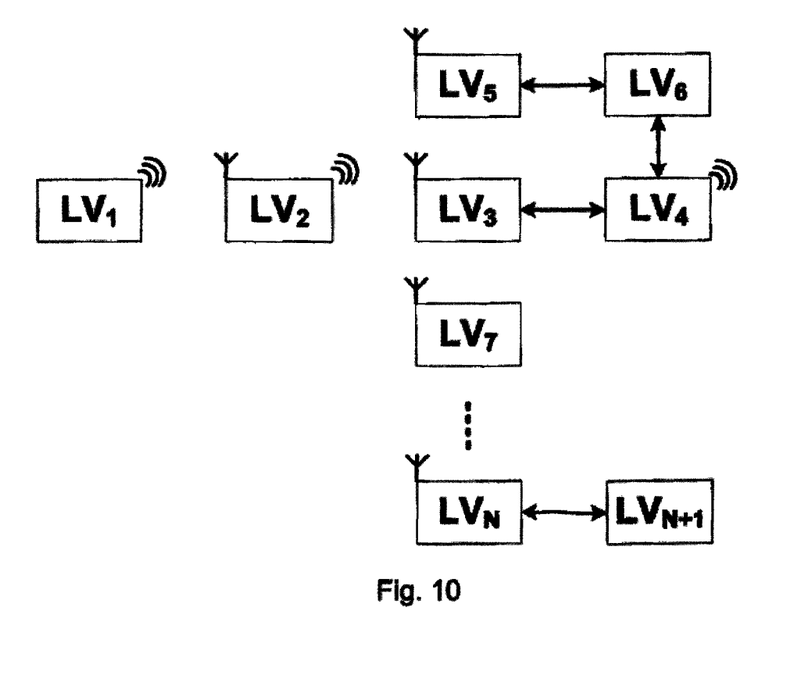
FIG. 10 shows another example of communication of illumination devices in an illumination system according to the invention.

The communication in FIG. 9 takes place via hardwired connections, but a mixed wireless/hardwired communication is shown in FIG. 10.

It should be pointed out again that the illumination devices shown in FIGS. 8 and 9 may each comprise one or more internal and/or external light fixtures.

However, the preceding figures show explicitly light fixtures in which one or more light fixtures may be part of an illumination device.

An especially simple design of the illumination system is obtained when the same light profiles are stored in all illumination devices of the illumination system SYS. In this way all the relevant information about autonomous adjustment of the luminous intensity is available for each illumination device. The illumination devices may be interchanged without disturbing the functionality of the system, i.e., one device may be replaced by a similar device, e.g., for maintenance purposes, etc. without any problem at all.

Fundamentally the information ascertained by the sensors belonging to an illumination device in question has a higher priority than information transmitted from other illumination devices to the illumination device in question, but preferably all information is used for a decision by the illumination device in question. However, if there is no external information, the unit will decide autonomously how the luminous intensity, etc. is to be adjusted, i.e., independently of the information of other illumination devices.

Furthermore, it is also expedient if the choice of the illumination devices to which information is to be transmitted from an illumination device is made in an object-specific manner, i.e., depending on the object type.

Alternatively or additionally it may be advantageous if the choice of the illumination devices to which information is transmitted from an illumination device depends on the position of the object in the illumination system.

In a concrete embodiment of the invention it is provided that an illumination device communicates only with its neighboring illumination devices.

The term "neighboring" is understood to refer to all the light fixtures present in a certain environment, for example, or in fact only the directly neighboring light fixtures, for example, in the case of a linear arrangement of the illumination devices only the illumination device arranged directly in front and directly behind the one in question.

Finally, it is also favorable if each light device decides autonomously to which illumination devices it will transmit information detected by itself and/or information obtained from one or more other illumination devices.

For the case when an illumination device sends information only to neighboring illumination devices, the illumination device thus decides whether information is to be transmitted at all and whether the received information is to be relayed further.

Since concrete luminous intensity values are specified in the light profiles, no computation work is necessary and instead the relevant value is simply read out and used for control of one or more light fixtures of an illumination device.

An illumination system according to the invention relates to // is an autarkic network, which does not require a central computer and the network can be expanded at will.

Today's illumination devices are any inefficient because they cannot supply the "correct" luminous intensity at the "correct" time. This becomes possible with the present invention and it is thus possible to lower the energy consumption and also to increase the quality of the illumination.

Furthermore, the failure of individual light fixtures can be compensated by neighboring light fixtures, for example, in that the sensor device detects this failure (decline in basic brightness) and this is taken into account accordingly with the other light fixtures.

Relatively any light sources can be used as the light sources, but light-emitting diodes, in particular so-called power LEDs, are especially suitable.

Figure 11:
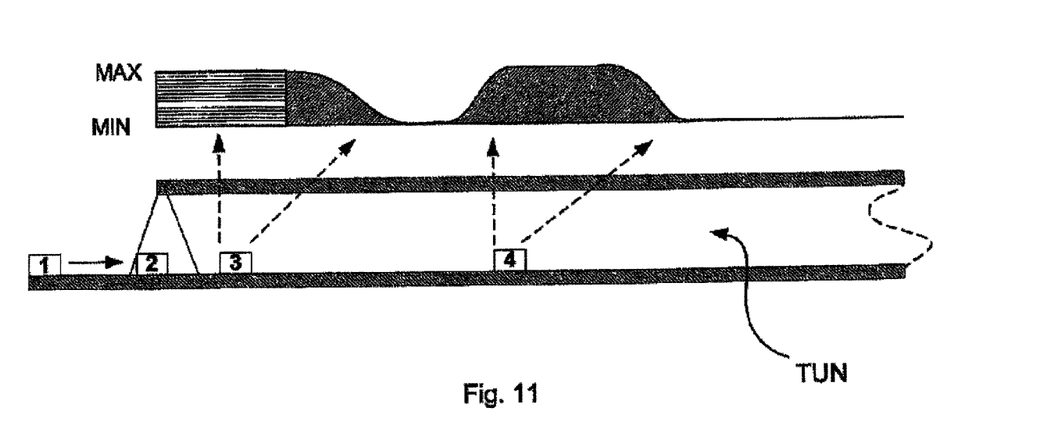
FIG. 11 shows an example of the light distribution of a vehicle before a tunnel and in a tunnel.

Finally, FIG. 11 shows an example of a vehicle before a tunnel TUN (position 1), at the start of the tunnel (position 2) and in the tunnel (position 3, position 4). An attempt is made here to supply the driver with a constant illuminated area in front of his vehicle. The tunnel entrance is always illuminated at a constant maximum level which depends on the ambient brightness that is not dependent on the position of the vehicle (position 1).

In position 2, the vehicle is detected by the sensor device of the first illumination device and the next 100 meters in the tunnel are illuminated at a constant level accordingly. If the vehicle is detected by the next sensor in its continued movement in the tunnel TUN, then another light fixture is activated, while the luminous intensity of the light fixture whose sensor the vehicle has just passed is reduced.

Finally, the constant aura of the object moving with it through the tunnel and the position of the object with respect to this aura are seen in position 4.

What is claimed is:

1. A illumination device comprising:
   at least one light fixture;
   at least one sensor device which detects objects and supplies information to the illumination device to thereby control the at least one light fixture, the at least one sensor device being configured to detect an object type of a detected object and determine the distance of the detected object;
   at least one memory configured to store at least one light profile which contains luminous intensity values as a function of the object type and the distance of the object from the at least one light fixture; and
   at least one control device which controls the at least one light fixture with a corresponding luminous intensity value in accordance with the information concerning the object type and the distance of the detected object in accordance with the information originating from the at least one sensor device.

2. The illumination device of claim 1, wherein:
   the at least one sensor device is configured to detect the object type of the detected object and determine the distance of the detected object from the at least one sensor device; and
   a separate light profile with luminous intensity values is stored as a function of the distance of the respective object from the at least one light fixture of the illumination device.

3. The illumination device of claim 1, wherein:
   the at least one sensor device is configured to detect the position of a detected object; and
   the at least control device is configured to control the at least one light fixture with a corresponding luminous intensity value in accordance with the information from the at least one sensor device and pertaining to the position of the detected object.

4. The illumination device of claim 1, further comprising at least one communication device configured to communicate with other illumination devices of the same type.

5. The illumination device of claim 1, wherein at least one of the at least one memory, the at least one sensor device, the at least one communication device, and the at least one control device is integrated into the illumination device.

6. The illumination device of claim 1, wherein the at least one light fixture is dimmable.

7. The illumination device of claim 1, wherein the at least one sensor device is configured to at least one of detect the speed of the detected object and a direction of movement of the detected object.

8. The illumination device of claim 7, wherein the control device is configured to adjust at least one of a rate of activation, a rate of deactivation and the illumination time of the at least one light fixture as a function of at least one of the speed of the detected object, the direction of movement of the detected object, and the position of the detected object.

9. An illumination system comprising:
   a plurality of illumination devices each including:
   at least one light fixture;
   at least one sensor device which detects objects and supplies information to the illumination device to thereby control the at least one light fixture, the at least one sensor device being configured to detect an object type of a detected object and determine the distance of the detected object;
   at least one memory configured to store at least one light profile which contains luminous intensity values as a function of the object type and the distance of the object from the at least one light fixture; and
   at least one control device which controls the at least one light fixture with a corresponding luminous intensity value in accordance with the information concerning the object type and the distance of the detected object in accordance with the information originating from the at least one sensor device,
   wherein each illumination device is controlled as a function of at least one of the detected object type, the position of the detected object and a direction of movement of the detected object from the at least one light fixture of an illumination device with a corresponding luminous intensity.

10. The illumination system of claim 9, further comprising communication means configured to permit neighboring illumination devices are configured to communicate with one another to exchange information, such that the information transmitted by the illumination device includes at least sensor information from its at least one sensor device and wherein such an illumination device receiving information transmitted by one or more neighboring illumination devices receives the information uses the information to select the luminous intensity for its at least one light fixture.

11. The illumination system of claim 9, wherein the same light profiles are stored in the illumination devices.

12. The illumination system of claim 9, wherein a selection of the illumination devices to which information is transmitted from a neighboring illumination device is dependent upon the type of object.

13. The illumination system of claim 9, wherein the choice of the illumination devices to which information is transmitted from an illumination device as a function of the position of the detected object and the direction of movement in the illumination system.

14. The illumination system of claim 9, wherein each illumination device communicates only with neighboring illumination devices.

15. The illumination system of claim 9, wherein each illumination device decides autonomously to which illumination devices it will transmit at least one of information it has detected itself and information it has obtained from other illumination devices.

16. A method of illuminating a location to be illuminated using an illumination system, the method comprising:
   providing a plurality of illumination devices, each illumination device including:
   at least one light fixture;
   at least one sensor device which detects objects and supplies information to the illumination device to thereby control the at least one light fixture, the at least one sensor device being configured to detect an object type of a detected object and determine the distance of the detected object;
   at least one memory configured to store at least one light profile which contains luminous intensity values as a function of the object type and the distance of the object from the at least one light fixture; and
   at least one control device which controls the at least one light fixture with a corresponding luminous intensity value in accordance with the information concerning the object type and the distance of the detected object in accordance with the information originating from the at least one sensor device; and then
   controlling each illumination device as a function of at least one of the detected object type, the position of the detected object and a direction of movement of the detected object from the at least one light fixture of an illumination device with a corresponding luminous intensity.

17. The method of claim 16, wherein each illumination device further includes communication means configured to permit neighboring illumination devices are configured to communicate with one another to exchange information, such that the information transmitted by the illumination device includes at least sensor information from its at least one sensor device and wherein such an illumination device receiving information transmitted by one or more neighboring illumination devices receives the information uses the information to select the luminous intensity for its at least one light fixture.

18. The method of claim 16, wherein the same light profiles are stored in all illumination devices of the illumination system.

19. The method of claim 16, wherein each illumination device selects:
   the illumination devices to which it transmits information as a function of the object type; and
   the illumination devices to which it transmits information and does so as a function of the position of the detected object in space.

20. The method of claim 16, wherein each illumination device:
   communicates only with neighboring illumination devices; and
   decides autonomously to which illumination devices it will transmit at least one of information detected by itself and information received from other illumination devices.

* * * * *